United States Patent
Brunzema

(10) Patent No.: US 10,216,588 B2
(45) Date of Patent: Feb. 26, 2019

(54) DATABASE SYSTEM RECOVERY USING PRELIMINARY AND FINAL SLAVE NODE REPLAY POSITIONS

(71) Applicant: SAP SE, Walldorf (DE)

(72) Inventor: Martin Brunzema, Berlin (DE)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 15/358,489

(22) Filed: Nov. 22, 2016

(65) Prior Publication Data

US 2018/0143884 A1    May 24, 2018

(51) Int. Cl.
  *G06F 11/00*    (2006.01)
  *G06F 11/14*    (2006.01)

(52) U.S. Cl.
  CPC ...... *G06F 11/1471* (2013.01); *G06F 2201/80* (2013.01); *G06F 2201/805* (2013.01); *G06F 2201/82* (2013.01)

(58) Field of Classification Search
  CPC ......... G06F 17/30174; G06F 17/30176; G06F 17/30194–17/30215; G06F 11/1471; G06F 11/1474
  See application file for complete search history.

(56) References Cited

U.S. PATENT DOCUMENTS

| | | | |
|---|---|---|---|
| 7,480,672 B2 | 1/2009 | Hahn et al. | |
| 9,058,371 B2 | 6/2015 | Thomsen et al. | |
| 9,069,704 B2 | 6/2015 | Schreter | |
| 9,092,475 B2 | 7/2015 | Schreter | |
| 9,110,601 B2 | 8/2015 | Vorsprach et al. | |
| 2006/0224634 A1 | 10/2006 | Hahn et al. | |
| 2013/0117237 A1* | 5/2013 | Thomsen | G06F 17/30377 707/683 |
| 2014/0379660 A1 | 12/2014 | Vorsprach et al. | |
| 2016/0147612 A1 | 5/2016 | Schefe et al. | |
| 2016/0147613 A1 | 5/2016 | Schefe et al. | |
| 2016/0147615 A1 | 5/2016 | Schefe et al. | |
| 2016/0147616 A1 | 5/2016 | Schefe et al. | |
| 2016/0147818 A1 | 5/2016 | Schefe et al. | |
| 2017/0322993 A1* | 11/2017 | Brodt | G06F 17/30578 |

OTHER PUBLICATIONS

Kristin, Andrea, "SAP HANA SPS 10—What's New?" retrieved from http://www.slideshare.net/SAPTechnology/hana-sps10-newbackrec-49804511, 29 pages, 2015.

Kelly, Ruth, "HANA Log Segments," retrieved from https://wiki.scn.sap.com/wiki/display/SAPHANA/HANA+Log+Segments, 1 page, 2015.

\* cited by examiner

*Primary Examiner* — Michael Maskulinski
(74) *Attorney, Agent, or Firm* — Klarquist Sparkman, LLP

(57) ABSTRACT

Technologies are described for facilitating database system recovery in a distributed database environment having a master node and at least one slave node. The at least one slave node receives a preliminary slave log backup position. The at least one slave node replays at least a portion of one or more log backups until the preliminary log backup position is reached. The at least one slave node receives a final slave log backup position. The slave node replays at least a portion of one or more log backups until the final slave log backup position is reached.

20 Claims, 9 Drawing Sheets

| Node Type | Operation | StartLogPos | EndLogPos | youngestCommitTime | slavePositions |
|---|---|---|---|---|---|
| Master | Start | 3312 | 4124 | 02:44 | |
| Master | End | | | | Slave1: 1020<br>Slave 2: 10050 |
| ... | | | | | |
| Master | Start | 4125 | 6183 | 02:48 | |
| Master | End | | | | Slave1: 6700<br>Slave2: 12000 |
| Slave 1 | Start | 1012 | 3043 | 02:46 | |
| Slave 1 | End | | | | |
| ... | | | | | |
| Slave 1 | Start | 3044 | 6835 | 02:50 | |
| Slave 1 | End | | | | |
| Slave 2 | Start | 10003 | 13002 | 02:46 | |
| Slave 2 | End | | | | |
| ... | | | | | |
| Slave 2 | Start | 13003 | 15846 | 02:55 | |
| Slave 2 | End | | | | |

710

| Operation | Commit Time | Master Redo Position | Slave 1 Position | Slave 2 Position |
|---|---|---|---|---|
| ... | ... | ... | ... | ... |
| DTX45, DML23 | | 6006 | | |
| DTX45, DML26 | | 6007 | | |
| COMMIT DTX45 | 02:46:02 | 6008 | 6802 | 14112 |
| T34, DML3 | | 6009 | | |
| DTX46, DML2 | | 6010 | | |
| COMMIT DTX46 | 02:46:20 | 6011 | | 14223 |
| DTX47, DML3 | | 6012 | | |
| COMMIT DTX47 | 02:46:50 | 6013 | 6810 | |
| T34, DML4 | | 6014 | | |
| COMMIT T34 | 02:47:45 | 6015 | | |
| ... | ... | ... | ... | ... |

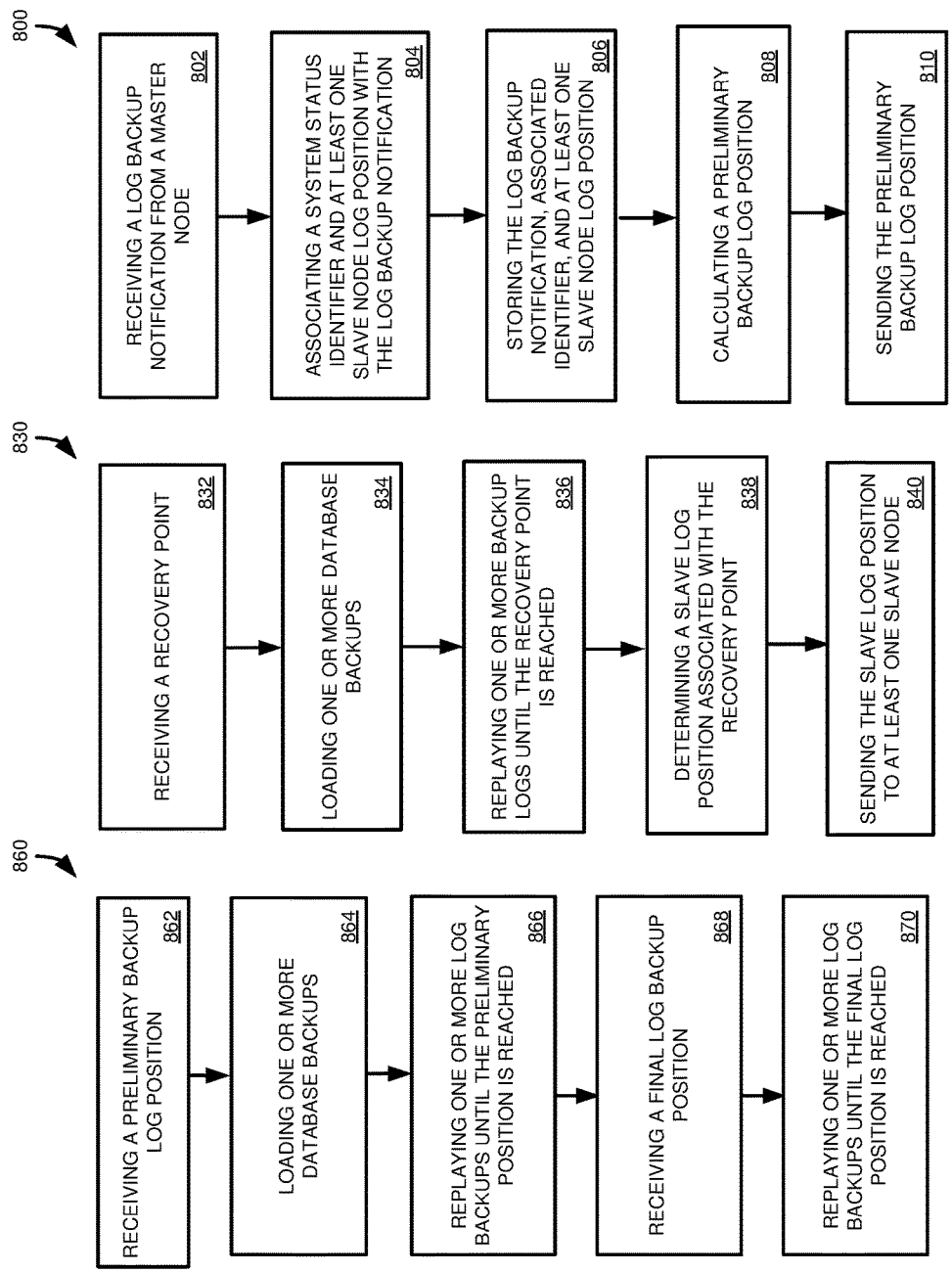

SOFTWARE 980 IMPLEMENTING DESCRIBED TECHNOLOGIES

DATABASE SYSTEM RECOVERY USING PRELIMINARY AND FINAL SLAVE NODE REPLAY POSITIONS

FIELD

The present disclosure generally relates to recovering a distributed database system. Particular implementations relate to facilitating recovery operations at one or more slave nodes using preliminary and final replay positions.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host. However, distributed systems can be more complex to recover after a crash or other disruption.

Typical database recovery schemes involve significant coordination between a master database system node and one or more slave nodes. In some cases, such as when backup files are maintained on a serial-access storage medium (e.g., a magnetic tape), the potential for deadlocks can exist. Recovery strategies to avoid deadlocks can involve complex algorithms and accompanying code, as well as requiring significant system resources and longer system recovery times. Thus, room for improvement remains in database system recovery.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for restoring a distributed database system having a master node and one or more slave nodes. In one aspect, at a slave node, a preliminary slave backup log position is received, such as from a backup strategy calculated by a backup manager. One or more backup logs are replayed, in whole or part, until the preliminary log position is reached. A final slave log position is received, such as from the master node. At least a portion of one or more backup logs are replayed until the final log position is reached.

In another aspect, at a master node in communication with at least one slave node, a recovery point is received, such as from a backup manager, the recovery point being associated with a backup strategy calculated by a backup manager. At least a portion of one or more log backups are replayed until the recovery point is reached. At least one slave log position associated with the recovery point is determined. The at least one slave log position is sent to the at least one slave node.

In a further aspect, at a master node operating a backup manager, the backup manager can receive a backup notification from a master node. The backup notification can be associated with a system status identifier, such as a most recent commit time associated with log entries associated with the backup notification. A furthest slave log position associated with the backup notification is determined. The log backup notification can be stored with the system status identifier and the slave log position.

According to another aspect, at a master node operating a backup manager, a preliminary backup log position is calculated for at least one slave node, such as by using a stored backup notification from the master node. The stored backup notification can be associated with a system status identifier, such as a commit time of a most recently committed log entry of log entries associated with the stored backup notification. The stored backup notification can also include a log position associated with the at least one slave node, such as the furthest slave log position associated with the backup notification. The log position can be sent to the slave node as the preliminary backup log position.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 presents a table of example log backup information that can be maintained in a backup catalog and a table of example log backup information that can be maintained at a master database node.

FIG. 8A is a flowchart of an example method summarizing actions occurring at a backup manager during log backup at a database node and during calculating of a database system recovery strategy.

FIG. 8B is a flowchart of an example method summarizing actions occurring at a master database node during database system recovery.

FIG. 8C is a flowchart of an example method summarizing actions occurring at a slave database node during database system recovery.

DETAILED DESCRIPTION

Example 1

Overview

Figure 1:
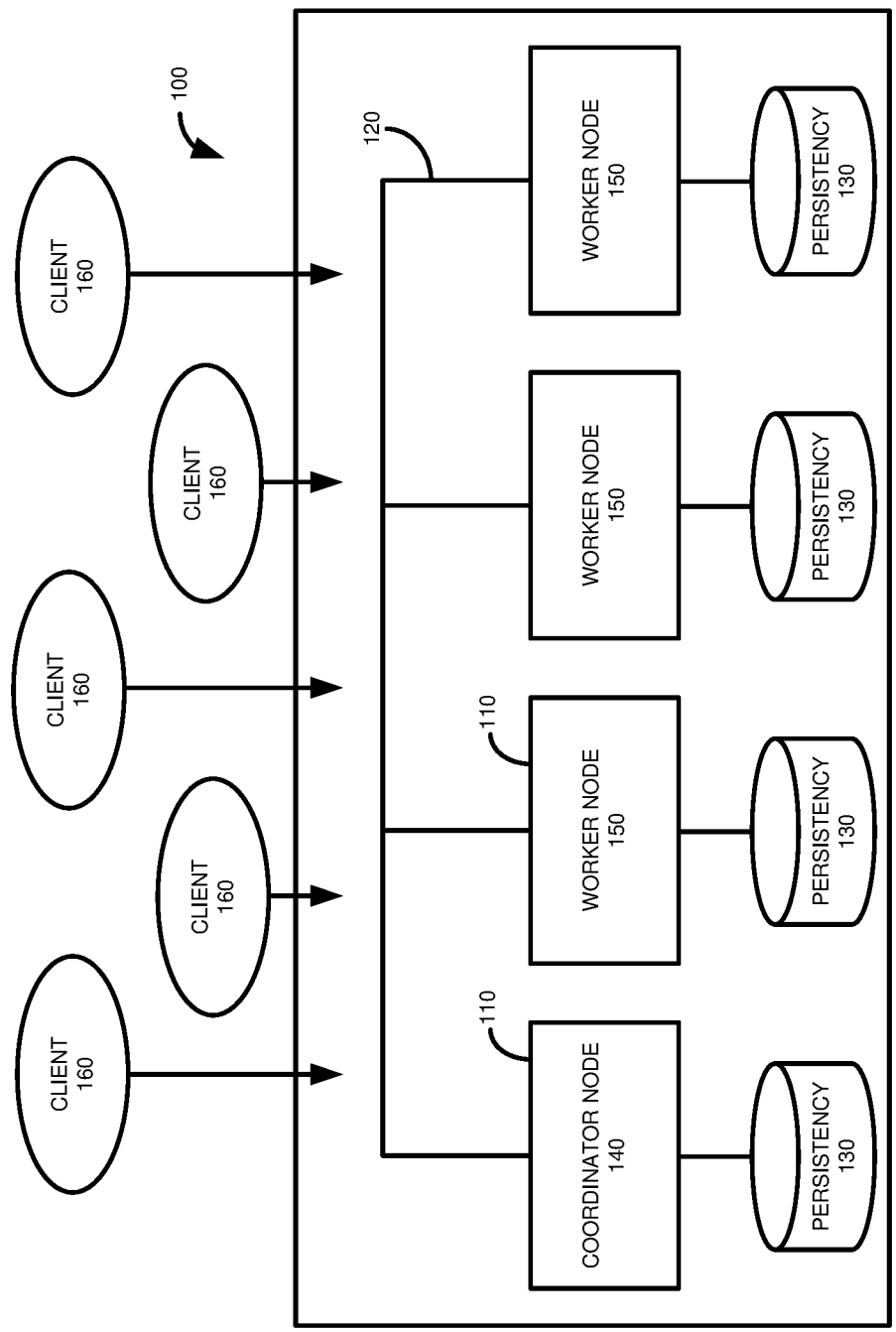
FIG. 1 is a diagram schematically depicting a distributed database environment having a coordinator node and a plurality of worker nodes.

Database systems are increasingly designed and optimized for memory-centric, massively-parallel data processing, not only in single database systems, but also in multi-host distributed database systems. Partitioning and distributing a database into multiple hosts is a desirable feature especially for high-performance in-memory database systems (such as the HANA database system of SAP SE of Walldorf, Germany), because it can leverage larger in-memory database spaces and a higher number of CPU cores beyond the limitations of a single physical machine (also referred to as a host, or node). For example, by partitioning and distributing large and fast growing fact tables over multiple hosts while replicating infrequently-updated dimension tables in a data warehouse system, or by partitioning a multi-tenant database into multiple hosts by tenants, it is typically possible to handle larger databases and higher workloads.

While database systems are increasingly operated with all or a substantial portion of the database data located in memory, rather than in secondary storage, data and information regarding database operations is typically written to persistent storage (e.g., a hard disk or magnetic tape) periodically. Persistent storage can be used to recover the database in the event of a crash or other event.

Typically, database data (e.g., the contents of database tables, such as row and column values) is saved periodically. In between saves, information can be saved regarding executed database operations (such as data manipulation (DML) statements, such as writes, updates, or deletions to database records, for example statements in the structured query language (SQL)). During recovery, saved data can first be restored, and then the saved information, such as in the form of redo log entries, can be replayed, from log backups, at the database system to restore a prior database system state.

Even for a non-distributed database system, the recovery process can be time consuming. In a distributed environment, the recovery process can become both more time consuming and complex. Database operations (e.g., in a transaction that includes DML statements) can be spread among different database system nodes. Replay of database operations typically needs to be controlled to ensure that operations are replayed in the correct sequence such that the restored database system accurately reflects the state of the database prior to the crash or other disruption.

Replay coordination can result in increased recovery time due to processing overhead, as well as increased resource utilization. Replay strategies, and the code implementing them, can be complex. In some cases, a single backup device, such as a single magnetic tape, can be used to store backup information. This limited resource can give rise to additional problems, such as nodes having to wait to carry out their recovery processes until another node has finished using the backup medium. In some cases, the operation of the backup device can introduce additional dependencies between various data streams, which can produce a deadlock situation. For example, for a distributed transaction, a master node may not be able to commit a transaction until a constituent database operation has been replayed at a slave node. However, if the master node has access to the backup file, the slave node may be blocked from replaying the transaction. Because the master and slave nodes are each waiting on the other, a deadlock situation arises. To try and avoid deadlocks, backup logs can be read into a buffer. However, if log backups are large, or bundled into larger units, the required buffer size may not be practical.

The present disclosure provides for improvements in database system recovery and restoration processes. During database system operation, logging activity of master and slave nodes can be sent to a backup manager. The log backups of the master node can be associated with a system status identifier, such as a timestamp (e.g., a commit time) or a commit ID, indicating the state of the database system when the logging activity was carried out. During recovery, a recovery plan (e.g., a determination of which backups need to be loaded or replayed to achieve a desired system state) can be created that compares a time to which the database system is to be restored to the timestamps associated with the master log backups. It is determined what log backups of the master node will need to be entirely replayed as part of the recovery, and a log backup that will need to be replayed in part. For the most recent log backup that will be completely replayed, a system status identifier, such as a timestamp or commit ID, can be determined. Based on this identifier, the corresponding slave log backup positions can be determined and sent to the slave nodes as preliminary log backup positions.

The master node and the slave nodes can then carry out their recovery processes. The slave nodes can carry out their recovery process until the preliminary log backup position is reached. The master node can continue replaying until the desired point in time is reached. When the master node is replayed to the desired point in time, the state of the database system, such as represented by a system status identifier (e.g., a timestamp or commit ID) can be determined and associated with slave log backup positions at that system state. The final backup log positions can be sent to the slave nodes and the slave nodes can replay their backup logs until their final backup log positions are reached.

This process can provide a number of advantages. The slave and master nodes need not coordinate during replay, other than the sending of the final slave log backup positions from the master node to the slave nodes. This can speed processing, and conserve system resources, including CPU usage and network traffic. For example, disclosed techniques can avoid synchronization network traffic, and improve network and other input/output (e.g., hard drive or tape drive) performance as the performance can be uninterrupted (or at least subject to significantly fewer interruptions). The process can also reduce memory use, as large buffers are not required for the recovery process. The process can also be easier to implement, and more reliable, as it does not require complex algorithms or code. In the case of serial backup media, the disclosed methods can eliminate deadlocks.

The present disclosure can also facilitate maintaining larger log backups. In some cases, individual log backups can be limited to a size that is impractical for large database workloads, with many log backups being generated. In some cases, log backups can be bundled together in larger units. However, the larger backups units can increase the chances for interdependencies, as discussed above, which can require complex replay strategies, raise the potential for deadlocks to occur, or both. By determining the preliminary replay log positions for the slave nodes as part of the recovery strategy, the replay activities of the master node and the slave nodes can be significantly decoupled, thus making larger backup log units more technically feasible.

Example 2

Distributed Database Environment

This Example 2 describes a distributed database system that may be used with at least certain embodiments of the disclosed database system recovery procedure. FIG. 1 illustrates a database environment 100 having a plurality of database nodes 110 connected through a network 120. In a particular example, the network 120 is a high-speed/low-latency network. A host refers to a computing system having a processor and memory. A host may also be referred to as a node. Unless the context clearly indicates otherwise, a node can refer to the host in a single host system (such as a single worker node), or one of a plurality of hosts in a system (such as one of a plurality of worker nodes).

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a master or coordinator node and database nodes 150 function as slave or worker nodes. A master node refers to a node (or host) that manages information regarding the master node and one or more slave nodes. A slave node refers to a node that is installed on a different host than the master node and has at least some of its activities or operations controlled or regulated by a master node.

The master node 140 and the slave nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

Although the master node 140 stores tables and partitions, the master node 140 also can act as a metadata master and a transaction coordinator for distributed transactions. For example, when a client 160 seeks to access metadata at a slave node 150, the slave node retrieves the corresponding metadata from the master node 140 and caches it locally. The cached metadata for a specific database object will be valid until the next DDL (data definition language) transaction is committed for that particular database object. Furthermore, being the transaction coordinator, the master node 140 decides about the commit of multi-node write transactions and can mediate between the slave nodes 150 when they need to exchange transactional information with each other.

The master node 140 can coordinate other activities. For example, the master node 140 can be responsible for coordinating a recovery process from persistent storage. The master node 140 can also be responsible for gathering and recording backup related information during database system operation.

The database nodes 110 are symmetric, in other respects, as each node 110 has its own persistency store 130 for log and checkpoint files. From the perspective of a client 160, an application may connect to any of the database nodes 110 and execute arbitrary read and write transactions. Tables can be partitioned and distributed across multiple database nodes 110. If a table has partitions defined via hash or range predicates, then those partitions can be distributed and stored in different nodes 110.

Example 3

Example Transaction Commit Protocol

Database manipulations can include multiple database operations (e.g., DML statements) in a transaction. The completion of a transaction can be indicated by the sending of a commit request from a database client to the database system. When a transaction is committed, the component DML statements are typically made visible to other users. In addition, upon commit, the transaction and its component DML statements can be written to persistent storage.

Committed transactions are typically assigned a unique identifier. For example, the database system (such as the coordinator or master node 140) can maintain a counter that assigns an identifier (e.g., a commit ID, which can be associated with a commit time) to committed transactions. In some cases, the commit ID can be an integer that increments upon each transaction commit. Thus, commit IDs can be used to represent the state of a database system, and to provide for ordering of transactions. When a database system is being restored or recovered, commit IDs can be used to ensure that transactions are replayed in the database system in the appropriate order.

Figure 2:
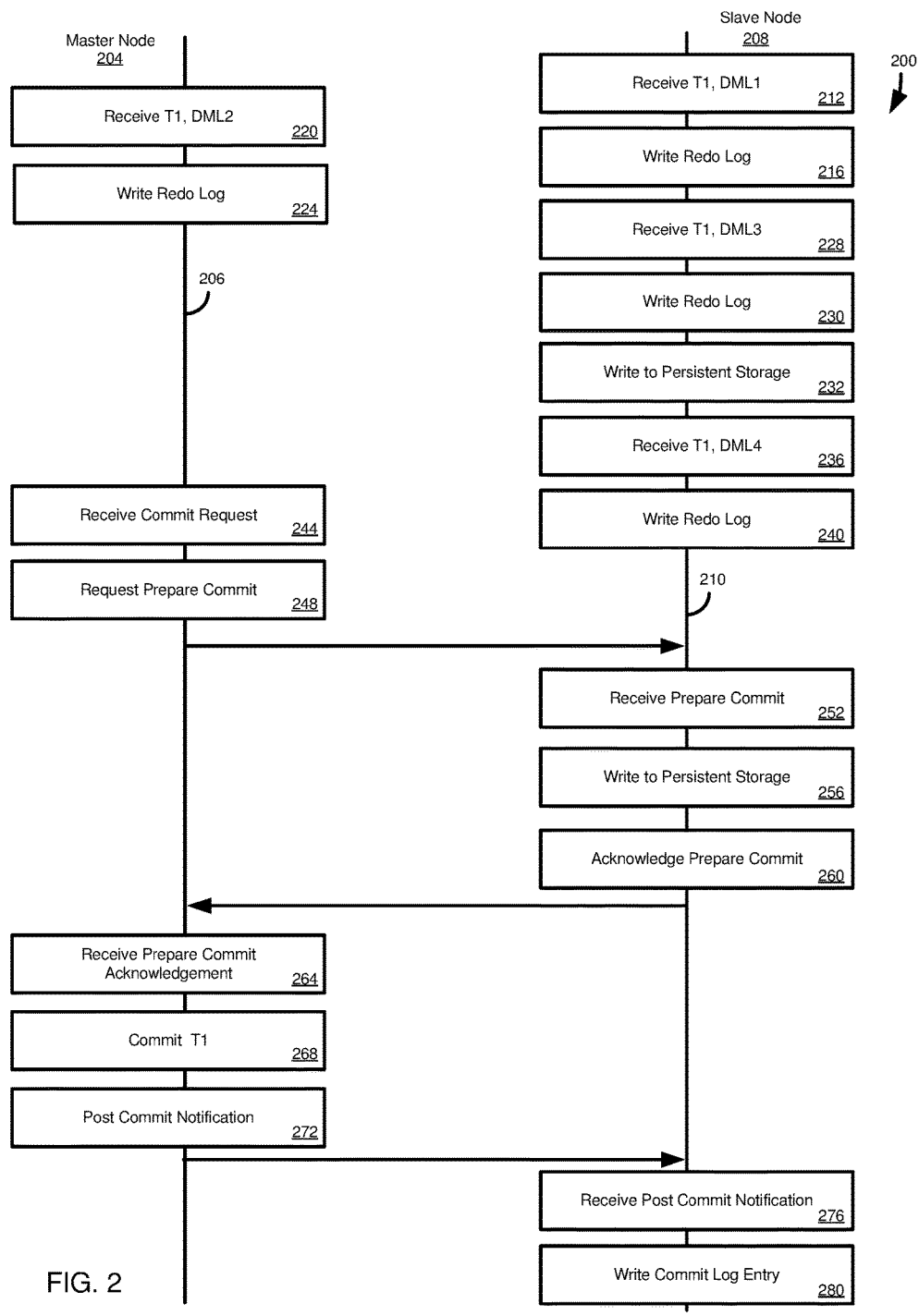
FIG. 2 is a diagram depicting operations occurring at a master node and a slave node during the commit of a distributed database transaction.

FIG. 2 illustrates an example of a commit protocol 200 that can be used in embodiments of the present disclosure. However, other commit protocols can be used without departing from the scope of the present disclosure. The commit protocol 200 includes actions occurring at a master node 204 and a slave node 208, having respective timelines 206, 210. The master node 204 and slave node 208 each receive database operations (DML statements) associated with a transaction T1. Thus, T1 is a distributed transaction.

At 212, the slave node 208 receives DML1 of T1. At 216, the slave node 208 writes DML1 to a redo log. As will be further described, redo log entries can be queued and periodically written to persistency. For example, the redo log entries can be persisted when a redo log buffer is full, when a transaction associated with the redo log entries is persisted, or upon another event. Periodically, the persisted log segments can be backed up in a log backup.

The master node 204 receives DML2 of T1 at 220. DML2 is written to a redo log of the master node 204 at 224. As with the slave node 208, the redo logs of the master node 204 can be periodically written to persistent storage. In various cases, the receiving of additional database operations (e.g., DML statements) can occur prior to, during, or subsequent to the writing of a redo log entry for a prior DML statement. For instance, the receipt of DML2 at 220 can occur prior to, concurrently with, or subsequently to the writing of the redo log for DML1 at 216.

The slave node 208 receives DML3 of T1 at 228, and writes the entry to the redo log at 230. At 232, the redo log buffer is written to persistent storage. For example, the redo log buffer may be written to persistent storage at 232 because the redo log buffer was full. At 236, the slave node 208 receives DML4 of T1, and writes the operation to the redo log buffer at 240.

The master node 204 receives a request for a commit operation at 244. In some cases, the commit request can be received by the slave node 208 and sent by the slave node to the master node 204. After receiving the commit request, the master node 204 sends a prepare commit request to the slave node 208 at 248. The slave node 208 receives the prepare commit request at 252, and writes the redo log buffer associated with the transaction to persistent storage at 256, even if the redo log buffer is not full. After the redo log buffer has been written, the slave node 208 sends a prepare commit acknowledgement to the master node 204 at 260.

After receiving the precommit acknowledgement from the slave node 208 at 264, the master node 204 commits the transaction T1 at 268. As part of the committing, the master node 204 can assign a commit ID to the transaction, and increment the commit ID counter. The commit of the transaction can also be written to persistent storage at the master node 204. At 272, the master node 204 sends a post commit notification to the slave node 208. The slave node 208 receives the post commit notification at 276 and writes the committed transaction, including the commit ID, to a commit log at 280, including persisting the entry.

Example 4

Example Database System Backup

In order to provide increased performance, some database systems keep all or a substantial portion of database data in memory. However, the database data, and other system information, is periodically written to persistent storage, such as if the database needs to be migrated, or recovered after a crash or other disruption.

Figure 3:
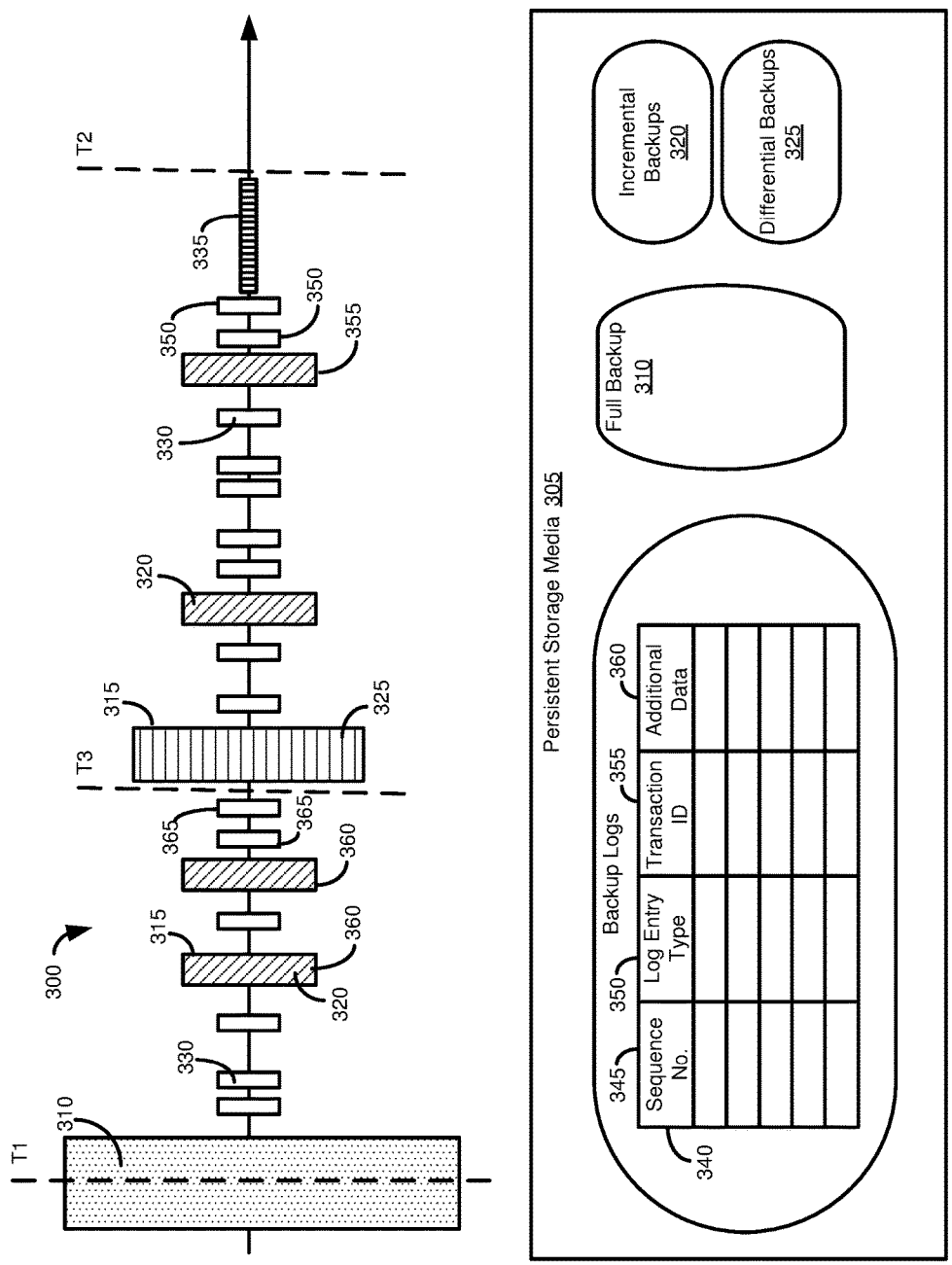
FIG. 3 is a diagram schematically depicting a sequence of various types of database backups, and an example backup log format.

FIG. 3 illustrates an example sequence 300 of backup operations of a database system (e.g., a particular database system node) and how the various types of backups can be maintained in persistent storage media 305. The sequence 300 includes a full backup 310 of database data, such as the information stored in the rows and columns of the database tables. The full backup 310 can include a large amount of data, and can be resource intensive to produce and maintain. Full backups 310 can be stored in the persistent storage media 305.

To help record the state of the database system between the acquisition of full backups 310, the database system can record delta backups 315, which can represent changes that have occurred in the database system since the last full backup. Like full backups 310, delta backups 315 can include database data. Delta backups 315 can be stored in the persistent storage media 305.

Delta backups 315 can have varying types. For example, incremental backups 320 are typically carried out more frequently than differential backups 325. Incremental backups 320 can be beneficial because they are faster to produce, but the need to process a greater number of incremental backups can make the recovery process longer than using a smaller number of larger differential backups 325. Although the example sequence 300 uses both incremental backups 320 and differential backups 325, in some cases, a single type of delta backup 315 can be used. In addition, in further cases, delta backups 315 need not be used.

In addition to full backups 310 and delta backups 315, a database system can include log backups 330. Rather than the actual database data, the log backups include the database operations that result in changes to the database data. For example, the log backups can include the redo log entries discussed in the commit protocol 200 of FIG. 2. Thus, the log backups 330 can include DML operations and commit operations. FIG. 3 also shows unpersisted log buffer(s) 335. An unpersisted log buffer 335 can represent a log buffer that is being used to record changes in the database system, but has not yet been persisted, such as because the buffer is not yet full or for which a commit operation has not been received which would cause the buffer to be persisted.

FIG. 3 provides an example of a write (or redo) log, maintained in persistent storage media 305, in the form of a table 340. The table 340 can include an identifier 345 (e.g., a log sequence number), which can indicate the log position of an entry (row) in the table 340. The identifiers 345 can thus be used to sequence the replay of database operations. The entries in the table 340 can have a type 350, such as the type of DML operation (e.g., INSERT, UPDATE, DELETE) associated with the entry. The table 340 can include a transaction identifier 355. The entries can include additional data 360 depending on the type 350 of entry, such as an indication of the affected database record and information regarding the data after the entry was executed. In other aspects, the table 340 can include more, less, or different information than shown. For example, the table 340 can include a commit ID for database operations associated with a committed transaction, as well as recording commit operations.

The backup information in the sequence 300 can be used to produce a recovery strategy in the event the database system is to be recovered from the persistent storage media 305. When the database system is being recovered, a user (such as a database administrator) can first determine to what state the database system should be restored. For example, the database can be restored to its most recent state (to the extent possible), to a specified time point, or to a specified full backup.

In the case of restoring the database system associated with the sequence 300 to the last full backup, time point T1, the full backup 310 would be loaded, but the differential backups 315, the persisted log backups 330, and the unpersisted log entries 335 (if available) would be discarded (or otherwise not loaded to produce the new starting state of the database system). In the case of restoring the database system to the most recent state possible, time point T2, the full backup 310 would be loaded, and all of the delta backups 315 applied. Redo logs 350 persisted after the last delta backup 355 (an incremental backup) would be replayed to reproduce the original database operations, including the database data produced thereby. If not destroyed by a source of database failure (or other reason the database system is being recovered), log entries 335 that have not been backed up (but which may be persisted or, potentially, unpersisted (e.g., entries that remain in the memory area from prior to recovery initiation)) can also be replayed.

For recovery to a specified point in time, other than the most recent time, such as time point T3, the full backup 310 would be loaded, as would delta backups 360. Persisted log backups 365 would be replayed. Subsequent log backs 330, delta backups 315, and unpersisted log backups 335 would not be replayed.

The sequence 300 represents backup operations, and how those operations may be used in restore operations, at a single database node, such as a coordinator node or master node (e.g., node 140 of FIG. 1) or a slave node (node 150). In a distributed database system, each database node would have its own backup or restore sequence similar to sequence 300. The backup information can be stored to different persistent storage media 305 for different nodes, or two or more nodes may share persistent storage media. In addition, while a single persistent storage medium 305 is shown as containing the full backups 310, delta backups 315, and persisted log backups 330, in practice the backups may be stored to different persistent storage media, including having different instances of the same backup type being stored to different persistent storage media.

In the case of a single node, loading of full backups 310 and delta backups 315, and replaying persisted log entries 330 and unpersisted log entries 335 is relatively straightforward. However, recovery in a distributed database system can be more complex, as described in Example 1. In particular, log replay (of persisted log backups 330 or unpersisted entries 335) typically must be coordinated to ensure that the database is restored to the correct state, and to avoid deadlocks during recovery (of particular importance when a serial access medium is used to store the backup information for all of the nodes in a distributed database system).

Example 5

Distributed Database Backup Components

Figure 4:
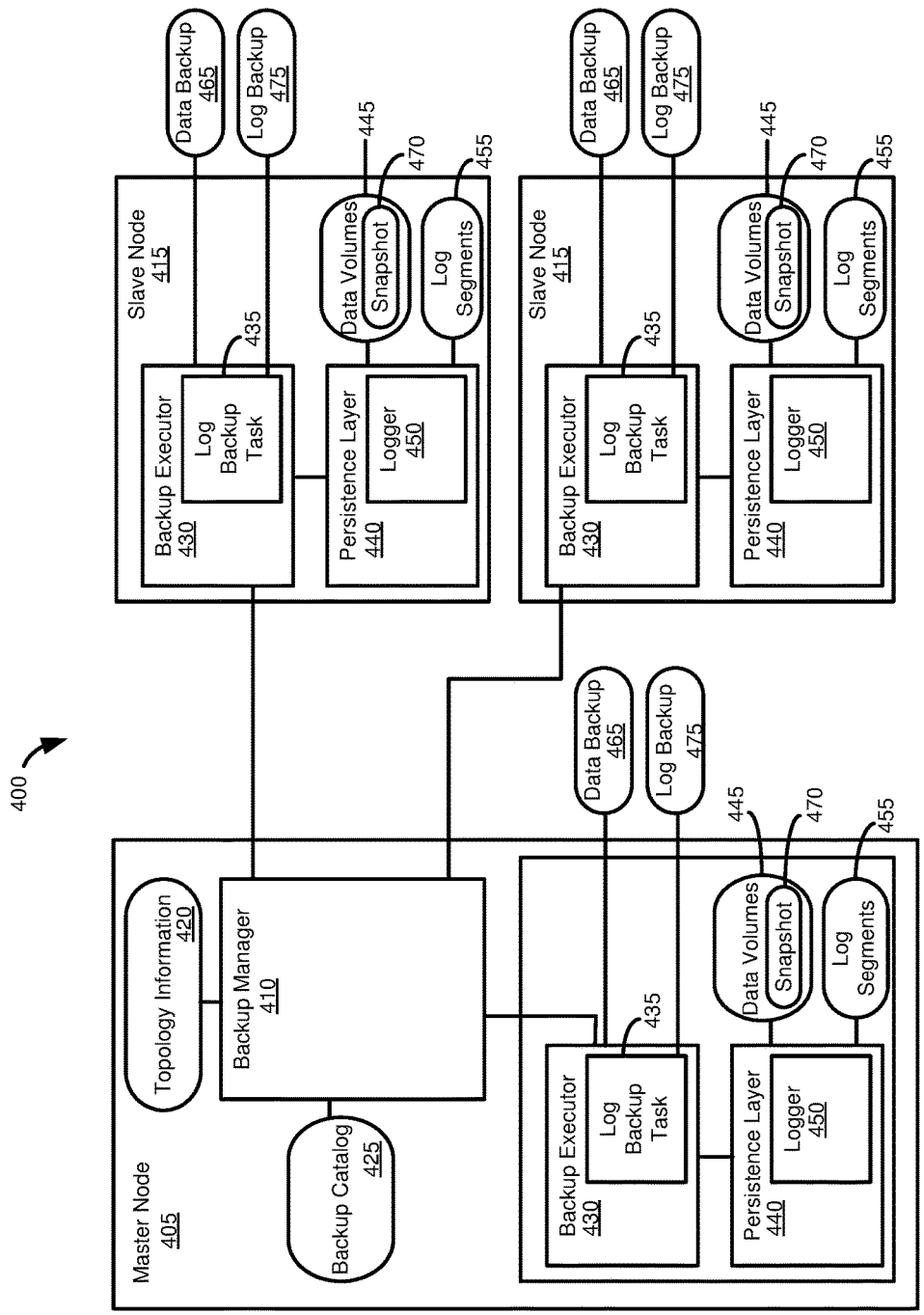
FIG. 4 is a diagram illustrating a distributed database system architecture providing for data and log backups.

FIG. 4 illustrates an example software architecture and database topology, referred to hereinafter as the architecture 400, in which the described innovations can be carried out. The architecture 400 includes a coordinator or master node 405. The master node 405 can operate a backup manager 410. The backup manager 410 can coordinate the creation of backups in a distributed system, such as a distributed system that includes the master node 405 and one or more slave nodes 415. The backup manager 410 can access topology information 420, which can include information regarding the nodes 405, 415 in the distributed system, and their interconnection. When a database system is restored from a backup, the backup manager 410 can use the topology information 420 to confirm that the recovery, or target, system is configured sufficiently similarly to the source system such that the backup can be recovered to the target system.

The backup manager 410 can create and maintain a backup catalog 425, which can include information regarding the various backups available on the nodes 405, 415, including full backups, delta backups, and log backups (e.g., as described in FIG. 3 of Example 4). The backup manager 410 can select appropriate backups from the backup catalog 425, and an order in which they should be applied, to implement a particular recovery strategy, such to recover the database system to a particular point (e.g., a point specified by a user, such as a database administrator, as specified above in Example 4).

Each of the nodes 405, 415 can operate a backup executor 430. The backup executors 430 can be responsible for executing log backup tasks 435, including storing information to a backup and retrieving information from a backup during recovery. Each backup executor 430 can communicate with a persistence layer 440 of its respective node 405, 415. The persistence layer 440 can be responsible for persisting database data as persisted data volumes 445. The persistence layer 440 can operate a logger component 450. The logger component 450 can be responsible for storing database operations (e.g., DML operations) in log buffers, and storing the log buffers as log segments 455 when appropriate (e.g., upon commit, when the buffer is full, after the passage of a particular time period, such as a determined or predetermined time period, or upon another event) as part of a log backup task 435 of the backup executor 430.

During a backup operation (e.g., a full backup or a delta backup), the backup executor 430 can communicate with the backup manager 410, such as to send information regarding the initiation and completion of backup activities. Similarly, the backup executor 430 can communicate with the backup manager 410 regarding the initiation and completion of backup activities. When a data backup is initiated, the backup executor 430 can save information from the data volumes 445 in a backup file 465. In some cases, before saving the data to the backup file 465, the backup executor 430 can direct the persistence layer 440 to create a snapshot 470 of the data volume 445 at the point in time the backup is to represent. The backup manager 410 can use the snapshot 470 to create the backup file 465. As changes may occur to the data volumes 445 during the backup process, the use of the snapshot 470 avoids having these changes propagated to the backup file 465 (in which case the backup file 465 would not accurately reflect the desired backup point, but rather a subsequent time point, or an inconsistent database state). The backup manager 410 can also periodically save the log segments 455 to a log backup file 475. For example, a particular log segment 455 can be backed up when it becomes full, after a time period (such as a determined or predetermined time period), or the occurrence of some other event (such as a command to save the current state of the database system, or a particular node 405, 415 thereof).

Although FIG. 4 has been described with respect to backup activities. The components of FIG. 4 can also be used in a database system recovery process. For example, the backup manager 410 can use the topology information 420 and the backup catalog 425 in calculating a recovery strategy. The backup manager 410 can also coordinate the loading of backup files 465 and the replay of log backup files 475 during recovery.

Example 6

Example Log Backup

Figure 5:
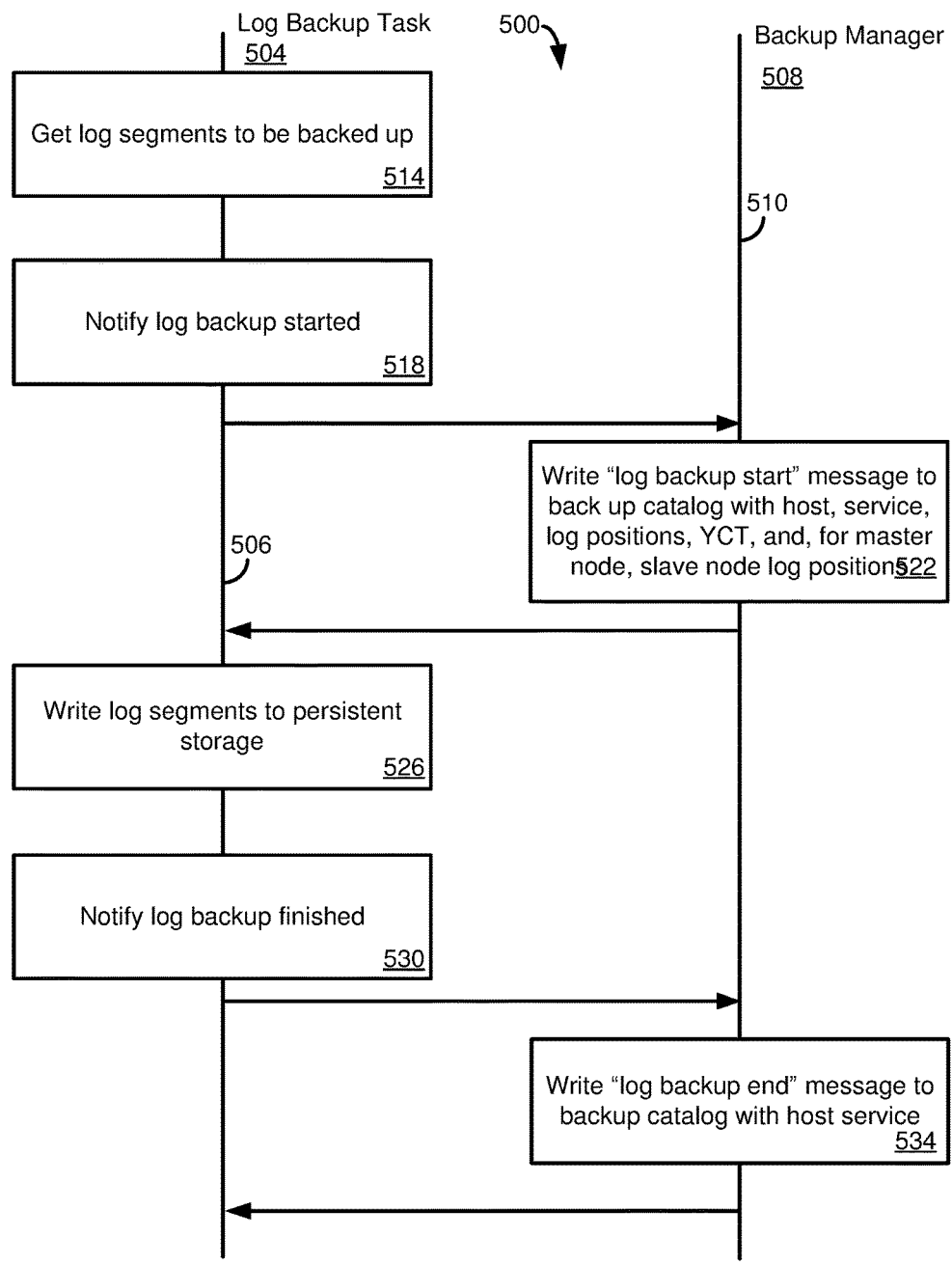
FIG. 5 is a diagram depicting operations occurring at a log backup task and a backup manager during log backup at a database node.

FIG. 5 illustrates a method 500 for communicating log backup information from a log backup task 504 (e.g., a log backup task 435 of FIG. 4) to a backup manager 508 (e.g., the backup manager 410), having respective timelines 506, 510. At 514, the log backup task 504 determines (such as by contacting the logger component 450) which log segments are to be backed up (e.g., which segments are full, or which have not been backed up for a time exceeding a threshold). At 518, the log backup task 504 sends a notification to the backup manager 508 that a log backup has been started.

At 522, the backup manager 508 writes a "log backup start" message to the backup catalog (e.g., the backup catalog 425 of FIG. 4). The "log backup start" message can include the host name of the node hosting the log backup task 504, the service with which the log backup is associated, and the starting and ending log position for the backup (e.g., the sequence number 345 of FIG. 3). The message can also include a system status identifier such as the youngest commit time (YCT), the time of the most recent commit operation associated with log entries in the log backup. For a master database system node, additional information is determined and recorded. In particular, along with the YCT value, the log positions of slave nodes in the system as of the YCT of the master node are extracted and recorded. These values can be written in the backup catalog 425, as well as being stored with the persisted log backups.

At 526 (optionally after receiving a confirmation from the backup manager 508 that the "log backup start" message was successfully written), the log segments to be backed up can be written to persistent storage (e.g., a log backup file 475). Once the log segments have been successfully written, the log backup task 504 can send a notification to the backup manager 508 at 530. At 534, the backup manager 508 can write to the backup catalog a "log backup end" message. As with the "start" message, the "end" message can include the host, service, and youngest commit time of the database system at the time the log backup was created.

As will be further described, the youngest commit times recorded in the log backup messages can be used to determine which slave node logs can be replayed without waiting for complete log replay at the master node.

Example 7

Example Recovery Process with Single Synchronization Point

Figure 6:
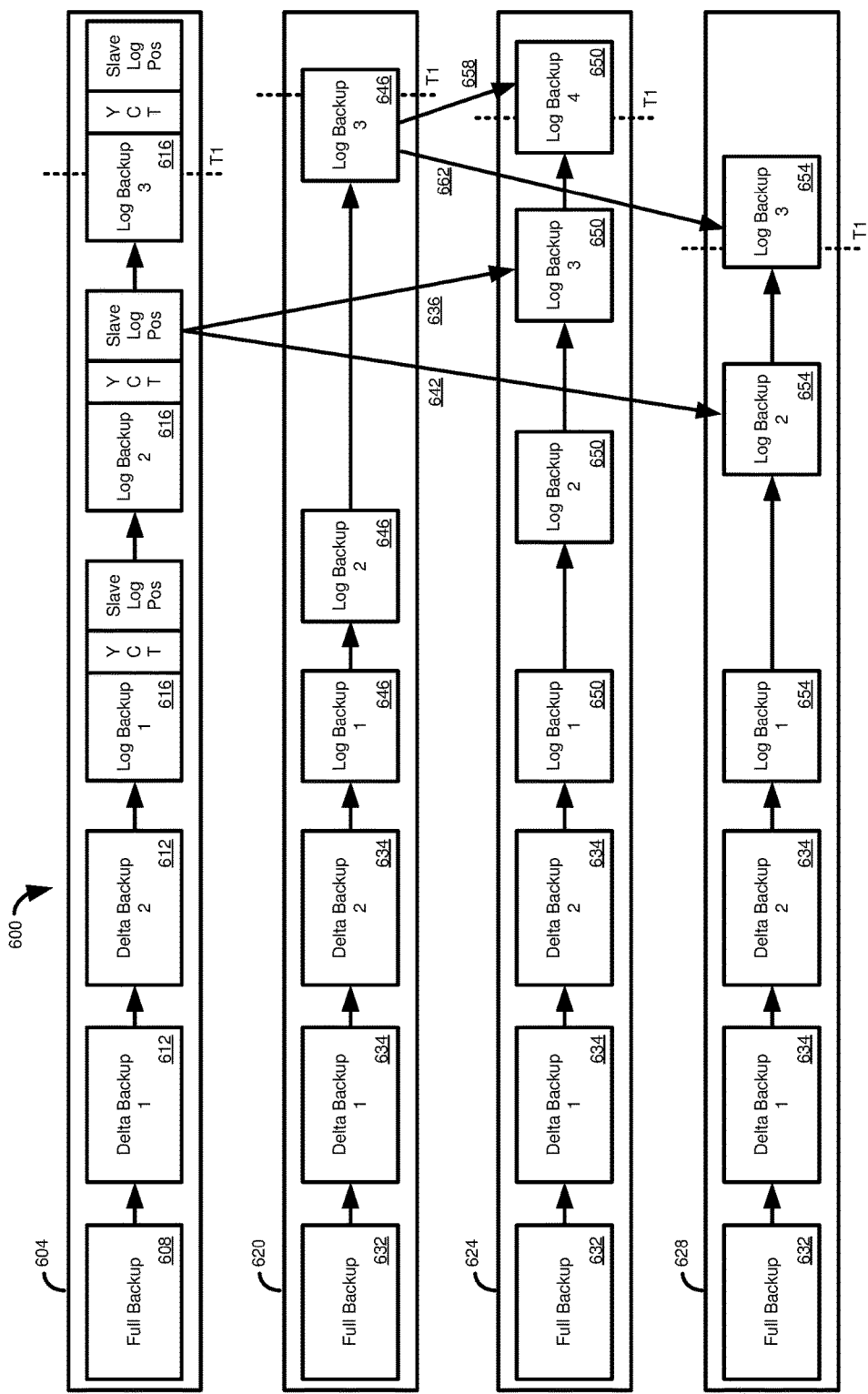
FIG. 6 is a diagram depicting a database recovery strategy and backup operations occurring during database system recovery at a master node and multiple slave nodes.

FIG. 6 illustrates elements of a distributed database system 600, depicting how storing the youngest commit time (or other system status identifier) with a log backup can be used to restore a database system with only a single synchronization point between a master node and one or more slave nodes.

FIG. 6 includes a recovery strategy 604. The recovery strategy 604 can be determined, such as by the backup manager 410 of FIG. 4, in response to a desired recovery point for the database system, such as set by a user (e.g., a database administrator). The recovery strategy 604 can be backups from a backup catalog (e.g., backup catalog XX) that need to be loaded and, in the case log backups, replayed to reach the desired recovery point. The recovery strategy 604 typically includes a full backup 608, which is often, but not necessarily, the most recent full backup of the database system.

Optionally, the recovery strategy 604 can include one or more delta backups 612 (which can be, for example, incremental backups or differential backups). The recovery strategy 604 can further include one or more log backups 616. The log backups 616 can include the commit logs for the database system, including for distributed transactions. The log backups 616 can also include information regarding backup activity at the master node and one or more slave nodes. As discussed in Example 6, log backup tasks can communicate with the backup manager regarding the initiation and completion of log backup processes, including the log positions associated with the log backup. The log backups also include the youngest commit time represented in the log backup, and, for a master node, can be associated with the furthest slave log positions contained in the particular log backup.

The example recovery strategy 604 shown in FIG. 6 includes three master log backups 616. Thus, for the recovery strategy 604, it can be known that log backup 1 and log backup 2 will need to be replayed entirely. Using the youngest commit times of the log backups, the time point T1 associated with the recovery point can be determined to be somewhere within log backup 3. Thus, log backup 3 will only be partially replayed.

FIG. 6 also indicates the recovery operations for a master node 620, a first slave node 624, and a second slave node 628. Although two slave nodes are shown, the distributed database system 600 can include more or fewer slave nodes. Each of the master node 620 and the slave nodes 624, 628 will load their full backups 632, and their delta backups 634 concurrently with one another. From the recovery time, it is determined that log backup 3 of the recovery strategy 604 will be partially replayed, and thus log backup 2 will be completely replayed. From the youngest commit times associated with slave node backup logs in log backup 2 of the recovery strategy 604, the last slave log positions in log backup 2 of the recovery strategy 604 can be determined.

These positions can be sent from the recovery strategy 604 (e.g., from a backup manager) to the slave nodes 624, 628 in communications 636, 642.

The master node 620 and the slave nodes 624, 628 can thus continue their recovery processes concurrently, with the master node 620 replaying its log backups 646 until the recovery time point T1 is reached. The slave nodes 624, 628 will replay their log backups, 650, 654, respectively, until the slave log positions sent in communications 636, 642 are reached.

When the master node 620 has reached the recovery point T1 in its last log backup 646 to be processed, the final log positions of the slave nodes 624, 628 can be determined and sent from the mater node 620 to the slave nodes in communications 658, 662. For example, the final log positions can be determined from the commit record of the last replayed distributed transaction involving the particular slave node 624, 628. With their final log positions known, the slave nodes 624, 628 can finish replaying their logs backups 650, 654 until the specific final log positions have been reached. At this point, the database system will have the state existing as of the specified recovery time point T1.

It should be noted that the contents of the log backups 616, 646, 650, and 654 can differ. The master node 620 and the slave nodes 624, 628 can have different numbers of log backups, and the log backups can represent different time periods/ranges of transactions or operations, and can contain different types of information. While slave node 624 has four log backups 650, slave node 628 has three log backups 654. The slave log positions sent from the backup manager 410 (from the recovery strategy 604) and the master node 620 can ensure that the slave nodes 624, 628 replay their respective logs 650, 654 such that the recovered database system accurately represents the database system as it previously existed at the recovery point T1.

In some cases, one or more of the full backups 632, delta backups 634, and log backups 646, 650, 654 for the master node 620 and the slave nodes 624, 628 can be stored in a common file and/or common storage media. In other cases, one or more of the full backups 632, delta backups 634, and log backups 646, 650, 654 for the master node 620 and the slave nodes 624, 628 can be stored in different files and/or different storage media.

The interaction of the master node 620 and the slave nodes 624, 628 with each other and with the recovery strategy 604 can simplify and expedite recovery, generally. For example, the recovery operations depicted in FIG. 6 can reduce coordination between the master node 620 and the slave nodes 624, 628, which can expedite the recovery process because fewer calculations need to be made and fewer communications need to occur, as single synchronization between the master node and the slave nodes can be used. Thus, the code for the recovery process can be simplified, including the removal of code to prevent deadlocks. By allowing the recovery processes of the master node 620 and the slave nodes 624, 628 to occur in parallel, the individual recovery processes can also proceed more quickly because there will be fewer interruptions, allowing input/output throughput to be maximized.

In the case of a serial access backup storage medium, the recovery process depicted in FIG. 6 can be particularly beneficial, as it can avoid deadlocks that can occur when, for example, slave nodes must periodically suspend their recovery operations while waiting for new slave log positions to be sent to them from a master node. In some prior processes, this kind of coordination between master and slave nodes would occur multiple times during a recovery process, rather than the single synchronization point provided by the recovery processes described in this Example 7.

Another benefit of the disclosed process is that it can simplify subsequent recovery attempts in the event an interruption occurs during the recovery process, such as because of an input/output error. If an error occurs, when recovery is resumed, the master node 620 and the slave nodes 624, 628 can resume from their previously reached recovery (loading of data files or log replay) stage, including log reply positions. The master node 620 and slave nodes 624, 628 are not required to resume from a common state, and thus subsequent recovery attempts can be both simplified and avoid carrying out operations that were performed during the initial recovery process.

Example 8

Example Determination of Preliminary and Final Slave Log Positions

FIG. 7 illustrates a table 710 of example information that may be kept in a backup catalog, such as backup catalog 425 of FIG. 4, which can be used to calculate the recovery strategy 604 of FIG. 6. FIG. 7 also illustrates an example of a table 715 of information that may be kept in a log backup of a master node, such as a log backup 646 of the master node 620 of FIG. 6. In particular, the table 715 can represent log backup 3 of the master node 620, the backup that will be partially replayed in reaching the recovery point T1. In other aspects, a log backup can have more, less, or different information than shown, and the information may be formatted or stored in a manner different from that shown in FIG. 7. The information in table 710 can be used to determine preliminary log replay positions for slave nodes, such as replay positions to send to the slave nodes 624, 628 of FIG. 6 in the communications 636, 642. The information in table 715 can be used to determine the final slave log positions to send to the slave nodes 624, 628 from the master node 620 in communications 658, 662.

In this example, the recovery time point has been set to the state of the database system at a youngest commit time of 02:47 (which may be a YCT specifically selected by a user, or the YCT closest to a recovery time selected by a user). In the recovery scenario of FIG. 6, the master node 620 can be directed to replay its logs until it reaches the log position associated with YCT 02:47, position 6013. Because of interdependencies between and within transactions, it is not known, at this point, what log positions will need to be reached by the slave nodes in reaching the recovery point. However, it is known that log backup 2 of the master node in the recovery strategy 604 will be replayed in its entirely (because its YCT is 02:44), as the point in time to which the system will be restored is contained within the subsequent backup, log backup 3 (that is, 2:47 is less than 2:48, the YCT of log backup 3).

From log backup 2 of the master node (having a YCT of 02:44), the further slave log position of slave 1 is 1020. This slave log position is sent to slave 1 (e.g., slave 624 in communication 648). For slave 2, log backup 2 of the master node indicates that the furthest slave log position of slave 2 is 10050. This value, is sent to slave 2 (e.g., slave 628 in communication 652).

Once the master node finishes its replay, the final slave log positions can be determined and sent to the slave nodes. For example, with reference to table 715, for slave 1, the distributed transaction including slave 1 and having a commit time closest to the commit time (02:47) of the recovery point in time, is DTX47, having a commit time of 02:46:50. The log backup of the master node has recorded the slave log position for slave 1 of 6810 as associated with DTX47, and so this slave log position represents the final slave log position for slave node 1 to be replayed in order to achieve the desired recovery state. Regarding slave 2, the distributed transaction including slave 2 and having a commit ID closest to the commit ID of the recovery point in time (02:47), is DTX46, having a commit time of 02:46:20. The log backup of the master node has recorded the slave log position of 14223 for slave 2 as associated with DTX46, and so this slave log position represents the final slave log position for slave 2 to be replayed in order to achieve the desired recovery state. These slave log positions can be sent, for example, in communications 658, 662.

Example 9

Example Recovery Operations

FIG. 8A is a flowchart of actions occurring at a backup manager prior to and during a recovery process according to a method 800 of the present disclosure. At 802, a backup log notification is received from a master node. The backup log notification can be a notification that the log backup process has been initiated or completed. In a particular example, the backup notification is a notification that the log backup process has been initiated.

At 804, the backup manager associates a system status identifier, such as a log entry with the youngest commit time of log entries to be backed up with the log backup notification. The backup manager also extracts the furthest slave log position for at least one slave node. At 806, the log backup notification, associated identifier, and furthest slave log position are stored, such as in a backup catalog.

At 808, as part of calculating a recovery strategy, a preliminary slave log position is calculated for at least one slave node. The calculation can include identifying the most recent master node log backup in the backup catalog that will be completely replayed in reaching a recovery point. The calculation can further include identifying the furthest slave node log position for the at least one slave node that will be reached in completely replaying the master node log backup. The preliminary replay log position is sent to the slave node at 810.

FIG. 8B is a flowchart of actions occurring at a master node during database system recovery according to a method 830 of the present disclosure. At 832, a recovery point, such as a commit ID, is received by the master node, such as from a recovery strategy of a backup manager. One or more database backups are loaded at 834. At 836, one or more log backups are replayed until the recovery point is reached. At least one slave log position associated with the recovery point is determined at 838. At 840, the at least one slave log position is sent to at least one slave node.

FIG. 8C is a flowchart of actions occurring at a slave node during database system recovery according to a method 860 of the present disclosure. At 862, the slave node receives a preliminary log backup replay position, such as from a recovery strategy of a backup manager. One or more database backups are loaded at 864. At 866, one or more log backups are replayed in whole or part until the preliminary log backup position is reached. A final log replay position is received, such as from a master node, at 868. At 870, at least a portion of one or more log backups are replayed until the final redo log position is reached. In particular aspects, the receiving at 868 is the only synchronization point between the slave node and the master node during the recovery process. For example, the slave node can replay log backups up to the preliminary log position received at 862 without waiting for, or coordinating with, the master node.

Example 10

Computing Systems

Figure 9:
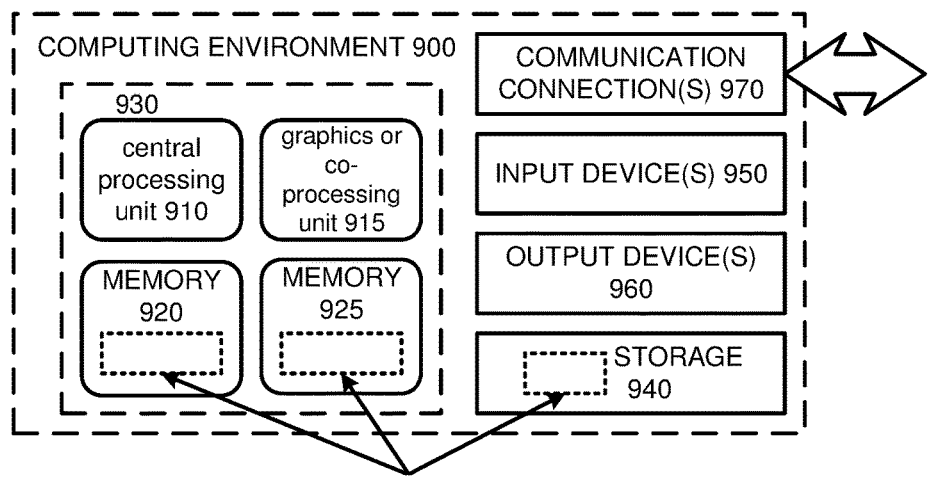
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11

Cloud Computing Environment

Figure 10:
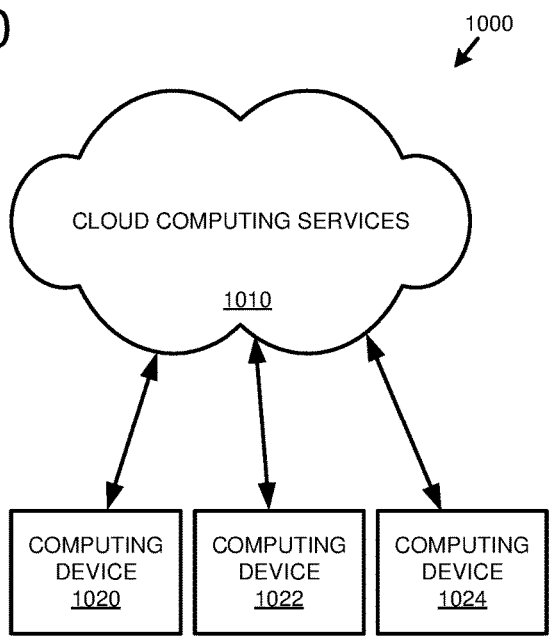
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

Example 12

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to carry out a database recovery at a slave database system node, the slave node in communication with a master node, the processing comprising:
receiving a preliminary slave log backup position from a backup manager;
replaying at least a portion of one or more log backups until the preliminary slave log backup position is reached;
receiving a final slave log backup position; and
replaying at least a portion of one or more log backups until the final slave log backup position is reached.

2. The one or more non-transitory computer-readable storage media of claim 1, wherein the final slave log backup position is received from a master node.

3. The one or more non-transitory computer-readable storage media of claim 2, wherein replaying one or more log backups until the preliminary slave log backup position is reached is carried out without coordination with a master node.

4. The one or more non-transitory computer-readable storage media of claim 1, wherein replaying one or more log backups until the preliminary slave log backup position is reached is carried out without coordination with a master node.

5. The one or more non-transitory computer-readable storage media of claim 1, wherein replaying one or more log backups until the preliminary slave log backup position is reached is carried out without waiting for a master node.

6. The one or more non-transitory computer-readable storage media of claim 1, the processing further comprising:
loading a full database backup prior to carrying out the replaying processes.

7. The one or more non-transitory computer-readable storage media of claim 6, the processing further comprising:
loading one or more delta backups prior to carrying out the replaying processes.

8. The one or more non-transitory computer-readable storage media of claim 1, the processing further comprising:
loading one or more delta backups prior to carrying out the replaying processes.

9. A method, implemented at least in part by a master node comprising a processing unit and memory, the master node being in communication with at least one slave node, for facilitating database system recovery within a database environment, the method comprising:
receiving a recovery point;
loading one or more delta backups;
after loading the one or more delta backups, replaying at least a portion of one or more log backups until the recovery point is reached;

determining a slave log backup position associated with the recovery point; and sending the slave log backup position to the at least one slave node.

10. The method of claim 9, further comprising:

loading a full database backup prior to carrying out the replaying.

11. The method of claim 9, wherein the recovery point is received from a backup manager.

12. The method of claim 9, wherein the master node does not coordinate with the at least one slave node during the replaying.

13. The method of claim 9, wherein determining the slave log backup position associated with the recovery point comprises identifying a distributed transaction involving the at least one slave node occurring most recently to the recovery point.

14. The method of claim 13, wherein determining the slave log backup position associated with the recovery point comprises determining the slave log backup position associated with the distributed transaction.

15. The method of claim 9, wherein the replayed at least a portion of one or more log backups comprises information in the loaded one or more delta backups.

16. A server comprising a processing unit and memory, wherein the server is configured to operate a backup manager of a distributed database system, the backup manager being in communication with a master node and one or more slave nodes, and further configured to perform a method for facilitating database system recovery, the method comprising:

calculating a preliminary backup log position for at least one of the one or more slave nodes; and sending the preliminary backup log position to the at least one of the one or more slave nodes.

17. The server of claim 16, the method further comprising:

receiving a backup notification from the master node;

associating the backup notification with a system status identifier;

determining at least one slave log position for at least one of the one or more slave nodes;

associating the at least one slave log position with the backup notification; and storing the backup notification, associated system status identifier, and associated at least one slave log position.

18. The server of claim 17, wherein the system status identifier comprises a youngest commit time of log entries associated with the backup notification.

19. The server of claim 16, wherein calculating the preliminary backup log position for the at least one of the one or more slaves nodes comprises:

determining a most recent log backup in a backup catalog that will be replayed entirely during system recovery; and determining a most recent slave log position associated with the most recent log backup.

20. The server of claim 19, wherein determining the most recent log backup comprises determining a log backup that precedes a log backup comprising a log entry associated with a recovery time.

* * * * *